(12) United States Patent
Umeda (10) Patent No.: US 7,076,991 B2
(45) Date of Patent: Jul. 18, 2006

(54) CALIBRATION EVALUATION METHOD AND DEVICE FOR ACCELERATION SENSOR

(75) Inventor: Akira Umeda, Tokyo (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 10/509,580

(22) PCT Filed: Mar. 31, 2003

(86) PCT No.: PCT/JP03/04130

§ 371 (c)(1),
(2), (4) Date: Apr. 25, 2005

(87) PCT Pub. No.: WO03/087848

PCT Pub. Date: Oct. 23, 2003

(65) Prior Publication Data

US 2006/0010959 A1    Jan. 19, 2006

(30) Foreign Application Priority Data

Mar. 29, 2002 (JP) .............................. 2002-097189

(51) Int. Cl.
*G01P 21/00* (2006.01)

(52) U.S. Cl. ...................................................... 73/1.39
(58) Field of Classification Search ................ 73/1.38, 73/1.39, 1.79
See application file for complete search history.

(56) References Cited

U.S. PATENT DOCUMENTS

| 5,000,030 A | 3/1991 | Umeda et al. |
| 5,952,554 A | 9/1999 | Umeda |
| 6,286,359 B1 | 9/2001 | Umeda |

FOREIGN PATENT DOCUMENTS

| JP | 01-272903 | 10/1989 |
| JP | 03-067175 | 3/1991 |
| JP | 3-109165 | 11/1991 |
| JP | 04-093653 | 3/1992 |
| JP | 5-273232 | 10/1993 |
| JP | 09-053912 | 2/1997 |

OTHER PUBLICATIONS

Umeda, Akira et al. "Frequency Characteristics of Accelerometers Measured by Impact in Low Frequencies", The Japan Society of Mechnical Engineers, pp. 477-482, with English abstract 1994.

*Primary Examiner*—Charles Garber
(74) *Attorney, Agent, or Firm*—Oblon, Spivak, McClelland, Maier & Neustadt, P.C.

(57) ABSTRACT

An acceleration sensor (22) to be calibrated and evaluated is affixed to one end surface (22) of a metal rod (1), and a plurality of projectiles (3) are made to impact the other end surface (2) of the metal rod at prescribed time intervals, generating an elastic wave pulse in the metal rod. Dynamic displacement, velocity or acceleration in a direction normal to the other end surface arising in a process of the generated elastic wave pulse reaching and being reflected by the one end surface where the acceleration sensor is affixed is measured, and an acceleration measured, processed and corrected by a strain gauge (25) attached to a side surface of the metal rod or by a laser interferometer (24) is obtained, and the corrected acceleration and the output of the acceleration sensor are compared to thereby carry out calibration and evaluation of the acceleration sensor.

25 Claims, 2 Drawing Sheets

(a) Shock acceleration generated by just the first projectile measured by strain gauge

(b) Shock acceleration generated by just the second projectile measured by strain gauge (c) Shock acceleration generated by just the third projectile measured by strain gauge (d) Shock acceleration generated by controlling the launch timing of projectiles to produce superposition, measured by strain gauge

CALIBRATION EVALUATION METHOD AND DEVICE FOR ACCELERATION SENSOR

TECHNICAL FIELD

The present invention relates to a method and apparatus for accurately and easily calibrating an acceleration sensor for detecting shock acceleration generated, for example, in car crash safety testing, robots, transportation equipment, equipment relating to nuclear power generation, ships, space and aeronautical equipment and micro-motion devices and the like.

BACKGROUND ART

Among acceleration sensors, shock acceleration sensors for detecting shock acceleration generated, for example, in car crash safety testing, robots, transportation equipment, equipment relating to nuclear power generation, ships, and space and aeronautical equipment and the like are widely used. When carrying out calibration and evaluation of shock acceleration sensors, conventionally, a method of installing an acceleration sensor on a mounting table of a single axis vibration table and using a laser interferometer to measure the motion of the mounting table is a technique that has been regarded as having the highest reliability and which has been used as the primary standard. However, high acceleration cannot be generated with this evaluation apparatus, and there is also the effect of parasitic rolling vibration, making inaccurate evaluations unavoidable.

When carrying out calibration and evaluation of such shock acceleration sensors, also, an apparatus is required for generating the shock acceleration. This being the case, the present inventor has previously proposed a technique in which one end surface of a metal rod is impacted with a metal projectile launched from a single launch tube, an acceleration sensor is attached to the other end surface of the metal rod, and shock acceleration arising when the internal elastic wave pulse generated by the impact of the projectile against the one end surface of the metal rod is reflected by the other end surface of the metal rod where the acceleration sensor is affixed is used to evaluate the frequency characteristics of the acceleration sensor (Japanese Patent No. 1902031, U.S. Pat. No. 5,000,030).

The above technique for evaluating shock acceleration simply impacts the metal rod with the metal projectile from a single launch tube, and therefore cannot generate narrower band shock acceleration having industrial significance, and in particular cannot control the launch timing, so has the drawbacks of the duration time of the generated shock acceleration being too short, and the frequency bandwidth becoming too wide.

Therefore, the object of the present invention is to provide an acceleration sensor calibration and evaluation method and apparatus that, in the evaluation of the dynamic characteristics of an acceleration sensor that detects shock acceleration, solves the above-described problems of the conventional evaluation technique using a vibration table and, furthermore, enables the shock acceleration waveform and frequency bandwidth to be freely controlled.

DISCLOSURE OF THE INVENTION

The acceleration sensor calibration and evaluation method according to the present invention comprises attaching a strain gauge to a side surface of a metal rod and affixing an acceleration sensor to be calibrated and evaluated to one of end surfaces of the metal rod, impacting a plurality of projectiles against the other of the end surfaces of the metal rod to generate an elastic wave pulse in the metal rod, taking, as an input signal to an acceleration sensor and a strain gauge, dynamic displacement, velocity or acceleration in a direction normal to the other end surface arising in a process of the elastic wave pulse generated at the other end surface of the metal rod reaching and being reflected by the one end surface where the acceleration sensor is affixed, measuring the input signal with the acceleration sensor and the strain gauge, processing measurement values of the strain gauge to obtain an acceleration, and comparing the acceleration with an output of the acceleration sensor.

The acceleration sensor calibration and evaluation method according to the present invention also comprises affixing an acceleration sensor to be calibrated and evaluated to one of end surfaces of a metal rod, locating a laser interferometer that irradiates the metal rod one end surface with a laser beam, impacting a plurality of projectiles against the other of the end surface of the metal rod at prescribed time intervals to generate an elastic wave pulse in the metal rod, taking as input signals to the laser interferometer and the acceleration sensor, dynamic displacement, velocity and acceleration in a direction normal to the other end surface arising in a process of the elastic wave pulse generated at the other end surface of the metal rod reaching and being reflected by the one end surface where the acceleration sensor is affixed, measuring any one of the input signal with the acceleration sensor and the laser interferometer, processing measurement values of the laser interferometer to obtain an acceleration, and comparing the acceleration with an output of the acceleration sensor.

The acceleration sensor calibration and evaluation method according to the present invention also comprises attaching a strain gauge to a side surface of a metal rod and affixing an acceleration sensor to be calibrated and evaluated to one of end surfaces of the metal rod, locating a laser interferometer that irradiates the metal rod one end surface with a laser beam, impacting a plurality of projectiles against the other of the end surfaces of the metal rod to generate an elastic wave pulse in the metal rod, taking as input signals to the strain gauge, the laser interferometer and the acceleration sensor, dynamic displacement, velocity or acceleration in a direction normal to the other end surface arising in a process of the elastic wave pulse generated at the other end surface of the metal rod reaching and being reflected by the one end surface where the acceleration sensor is affixed, measuring any one of the input signals with the strain gauge, the acceleration sensor and the laser interferometer, processing measurement values of the strain gauge to obtain an acceleration, using a correction function relating to dynamic characteristics of the strain gauge based on measurement values of the laser interferometer to correct the acceleration obtained by the strain gauge processing, and comparing the corrected acceleration with an output of the acceleration sensor.

In addition to processing the measurement values of the strain gauge, the acceleration sensor calibration and evaluation method just mentioned above error-corrects a strain gauge output based on elastic wave theory.

Any one of the acceleration sensor calibration and evaluation methods also includes measuring any of gain-frequency characteristics, phase-frequency characteristics and peak sensitivity of the acceleration sensor in respect of any of dynamic displacement detection function, velocity detection function and acceleration detection function of the acceleration sensor.

Any one of the first, third, fourth and fifth mentioned acceleration sensor calibration and evaluation methods, in which the strain gauge comprises a plurality of the strain gauges attached to the side surface of the metal rod in an axial direction, further comprises converting differences in phase caused by differences in attachment position in the axial direction to a one-point measurement result, with respect to outputs of the strain gauges, based on wave propagation theory, to perform signal processing to reduce strain gauge signal noise.

An acceleration sensor calibration and evaluation apparatus according to the present invention comprises a metal rod on which is fixed at one of end surfaces thereof an acceleration sensor to be calibrated and evaluated, a strain gauge attached to a side surface of the metal rod, a projectile launch means that impacts the other of the end surfaces of the metal rod with a plurality of projectiles at prescribed time intervals to generate an elastic wave pulse in the metal rod, the acceleration sensor and the strain gauge being for measuring as input signals any of dynamic displacement, velocity and acceleration in a direction normal to the other end surface arising in a process of the elastic wave pulse generated by the impact of the projectiles reaching and being reflected by the one end surface where the acceleration sensor is affixed, a signal recording/processing apparatus that processes measurement values of the strain gauge to obtain acceleration and compares the acceleration with an acceleration sensor output to calibrate and evaluate the acceleration sensor.

The acceleration sensor calibration and evaluation apparatus according to the present invention also comprises a metal rod on which is fixed at one of end surfaces thereof an acceleration sensor to be calibrated and evaluated, a laser interferometer that irradiates the metal rod one end surface with a laser beam, a projectile launch means that impacts the other of the end surfaces of the metal rod with a plurality of projectiles at prescribed time intervals to generate an elastic wave pulse in the metal rod, the acceleration sensor and the laser interferometer being for measuring as input signals any of dynamic displacement, velocity and acceleration in a direction normal to the other end surface arising in a process of the elastic wave pulse generated by the impact of the projectiles reaching and being reflected by the one end surface where the acceleration sensor is affixed, a signal amplification/recording/processing apparatus that processes measurement values of the laser interferometer to obtain acceleration and compares the acceleration with acceleration sensor measurement values to calibrate and evaluate the acceleration sensor.

The acceleration sensor calibration and evaluation apparatus according to the present invention also comprises a metal rod on which is fixed at one of end surfaces thereof an acceleration sensor to be calibrated and evaluated, a strain gauge attached to a side surface of the metal rod, a laser interferometer that irradiates the metal rod one end surface with a laser beam, a projectile launch means that impacts the other of the end surfaces of the metal rod with a plurality of projectiles at prescribed time intervals to generate an elastic wave pulse in the metal rod, the acceleration sensor, strain gauge and acceleration sensor being for measuring as input signals any of dynamic displacement, velocity and acceleration in a direction normal to the other end surface arising in a process of the elastic wave pulse generated by the impact of the projectiles reaching and being reflected by the one end surface where the acceleration sensor is affixed, and a signal amplification/recording/processing apparatus that processes strain gauge measurement values to obtain acceleration, uses a correction function relating to dynamic characteristics of the strain gauge to correct the acceleration obtained by the strain gauge processing, based on measurement values of the laser interferometer, and compares the corrected acceleration with an output of the acceleration sensor to calibrate and evaluate the acceleration sensor.

The acceleration sensor calibration and evaluation apparatus mentioned first further comprises processing means that in addition to processing measurement values of the strain gauge carries out error correction of strain gauge output based on elastic wave theory.

In any one of the acceleration sensor calibration and evaluation apparatus mentioned above, the signal processing apparatus measures any of gain-frequency characteristics, phase-frequency characteristics and peak sensitivity of the acceleration sensor in respect of any of dynamic displacement detection function, velocity detection function and acceleration detection function of the acceleration sensor.

Any one of the first, third, fourth and fifth mentioned acceleration sensor calibration and evaluation apparatus, wherein the strain gauge comprises a plurality of strain gauges attached in an axial direction on the side surface of the metal rod, further comprises a noise reduction means that converts differences in phase caused by differences in attachment position in the axial direction to a one-point measurement result, with respect to outputs of the strain gauges, based on wave propagation theory, to perform signal processing to reduce strain gauge signal noise.

In the acceleration sensor calibration and evaluation apparatus just mentioned above, the strain gauge comprises a plurality of strain gauges attached in an axial direction on the side surface of the metal rod and a plurality of attached strain gauges disposed in a circumferential direction.

The acceleration sensor calibration and evaluation apparatus just mentioned above further comprises signal processing means that converts differences in phase caused by differences in attachment position in the axial direction to a one-point measurement result, with respect to outputs of the plurality of strain gauges, based on wave propagation theory, to perform signal processing to reduce strain gauge signal noise.

In any one of the acceleration sensor calibration and evaluation apparatus mentioned above, the projectile launch means has a plurality of round, concentric projectiles located on inner and outer portions of a launch tube.

In the acceleration sensor calibration and evaluation apparatus just mentioned above, the launch tube is a round, concentric multiple launch tube and has a plurality of round, concentric projectiles in a space between a center launch tube inner portion and each launch tube.

In the ninth mentioned acceleration sensor calibration and evaluation apparatus, the projectile launch means includes a launch controller that launches a plurality of projectiles independently at prescribed time intervals.

In the ninth mentioned acceleration sensor calibration and evaluation apparatus, the launch tube has a surface treated to reduce friction with the projectiles, and in any one of the acceleration sensor calibration and evaluation apparatus mentioned above, the projectiles have tips provided with members of a different material from that of a projectile body, or the projectile body is given a laminated structure comprised of different materials to adjust a frequency band of the elastic wave pulse generated in the metal rod by impact of the projectiles.

In any one of the acceleration sensor calibration and evaluation apparatus mentioned above, in accordance with Skalak's analytic solution in elastic wave theory, when obtaining a transient strain signal forming strain gauge input from the strain of an elastic wave pulse signal incident on the other end surface, at least a primary term of a series expanded Skalak's analytic solution is used or, to further improve precision, up to a high-order term of a Skalak's analytic solution is used.

In any one of the acceleration sensor calibration and evaluation apparatus mentioned above, the other end surface of the metal rod has a contact metal ball and the projectiles are impacted against the metal ball.

As described in the foregoing, the present invention is configured with an acceleration sensor affixed to one end surface of the metal rod, a strain gauge attached to the side surface of the metal rod, or a laser interferometer is used to irradiate the one end surface of the metal rod with a laser beam, and a plurality of projectiles are made to impact the other end surface of the metal rod at prescribed intervals. Therefore, the effect of parasitic rolling vibration is smaller than when calibrating an acceleration sensor using a conventional vibration table, so accurate calibration is possible.

Also, since a plurality of projectiles are made to impact the other end surface of the metal rod at prescribed intervals, the duration time of the elastic wave pulses can be made longer than in the case of a single-launch impact, making it possible to calibrate at a frequency band that is best suited to the object acceleration sensor, thereby enabling more accurate results to be obtained.

BEST MODE FOR CARRYING OUT THE INVENTION

Figure 1A:
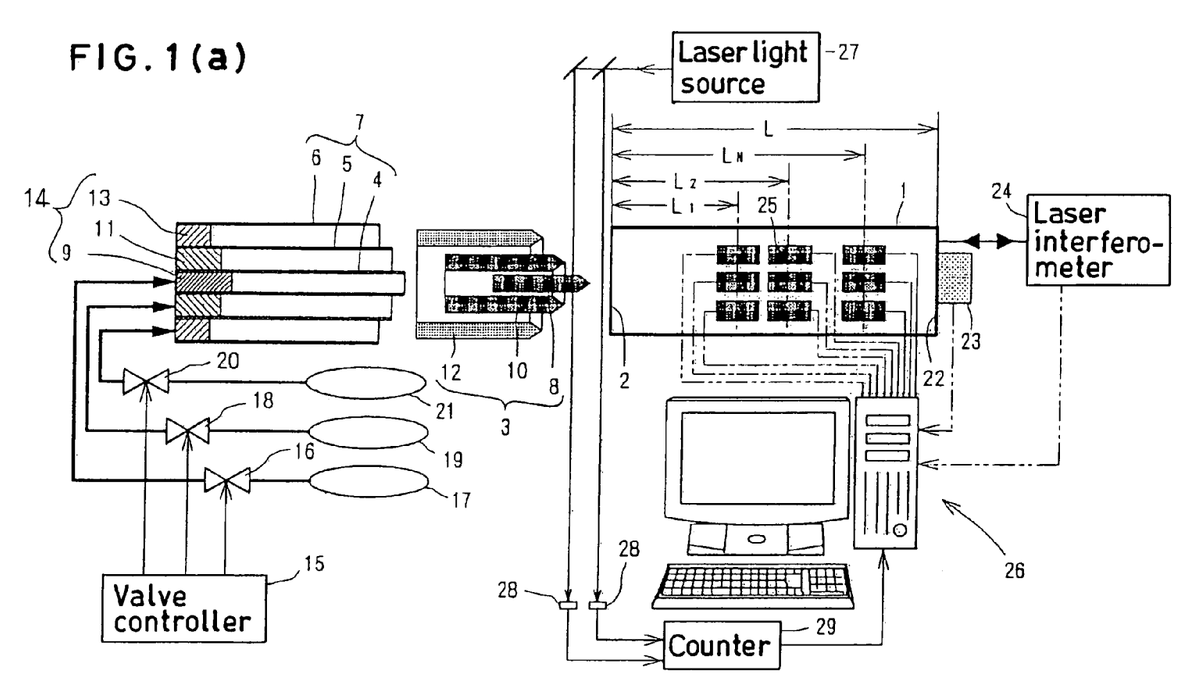
FIG. 1(a) is a schematic view showing an example of the acceleration sensor calibration and evaluation apparatus of the present invention.

FIG. 1(a) shows an example of the acceleration sensor calibration and evaluation apparatus according to the present invention. A plurality of projectiles 3, described later, impact a first end surface 2 of a metal rod 1 to generate an elastic wave pulse therein. For doing this, a multiple launch tube 7 having n (n=1 . . . N, innermost being 1, outermost being N) tubes, is used. In the illustrated example, the multiple launch tube 7 has three launch tubes: a center launch tube 4, a middle launch tube 5 and an outer launch tube 6. A multiplicity of n (n=1 . . . N, innermost being 1, outermost being N) projectiles 3 are launched at prescribed time intervals from this multiple launch tube 7.

Figure 1B:
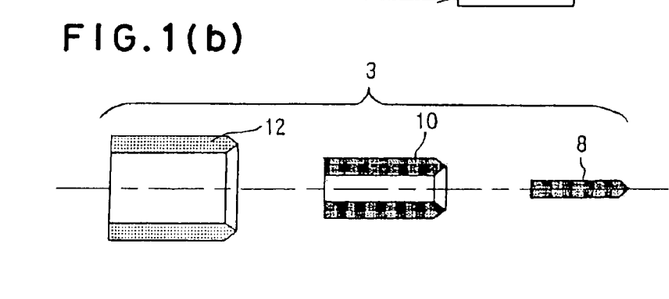
FIG. 1(b) is an explanatory view showing the flight of three projectiles in the acceleration sensor calibration and evaluation apparatus of FIG. 1(a).

In the illustrated example, a cylindrical first projectile 8 can be independently launched from the interior of the center launch tube 4 by a first launch apparatus 9, an annular second projectile 10 can be independently launched from the annular space between the center launch tube 4 and the middle launch tube 5 by a second launch apparatus 11, and an annular third projectile 12 can be independently launched from the annular space between the middle launch tube 5 and the outer launch tube 6 by a third launch apparatus 13. FIG. 1(b) is an explanatory view illustrating the flight of first, second and third projectiles 8, 10 and 12. The launch status can be detected by projecting in front of the metal rod 1 a pair of separated laser beams from a laser light source 27, using light receiving elements 28 to detect an interruption of these laser beams, using a counter 29 to measure the time difference thereof, and inputting the data to a personal computer 26.

In the launching of the above projectiles from the launch apparatus 14, a valve controller 15 opens a first valve 16, supplying high-pressure air from a first high-pressure air source 17 to the first launch apparatus 9 to thereby launch the first projectile 8 in the center launch tube 4 toward the first end surface 2 of the metal rod 1. When the first projectile 8 impacts the first end surface 2 of the metal rod 1, in the metal rod 1 an elastic wave pulse having the type of waveform shown in FIG. 2(a) is produced that propagates in the metal rod 1 and produces a shock acceleration at the end surface.

The valve controller 15 also opens a second valve 18 a prescribed time $\alpha 1$ after opening the first valve 16, supplying high-pressure air from a second high-pressure air source 19 to the second launch apparatus 11, whereby the annular second projectile 10 located between the center launch tube 4 and the middle launch tube 5 is launched toward the first end surface 2 of the metal rod 1. When the second projectile 10 impacts against the first end surface 2 of the metal rod 1, inside the metal rod 1 an elastic wave pulse having the type of waveform shown in FIG. 2(b) is generated and propagates in the metal rod 1 with a time-lag of al relative to the waveform produced by the impact of the first projectile 8.

Similarly, the valve controller 15 also opens a third valve 20 a prescribed time $\alpha 2$ after opening the first valve 16, supplying high-pressure air from a third high-pressure air source 21 to the third launch apparatus 13, whereby the annular third projectile 12 located between the middle launch tube 5 and the outer launch tube 6 is launched toward the first end surface 2 of the metal rod 1. When the third projectile 12 impacts against the first end surface 2 of the metal rod 1, inside the metal rod 1 an elastic wave pulse having the type of waveform shown in FIG. 2(c) is generated and propagates in the metal rod 1 with a time-lag of $\alpha 2$ relative to the waveform produced by the impact of the first projectile 8.

Figure 2:
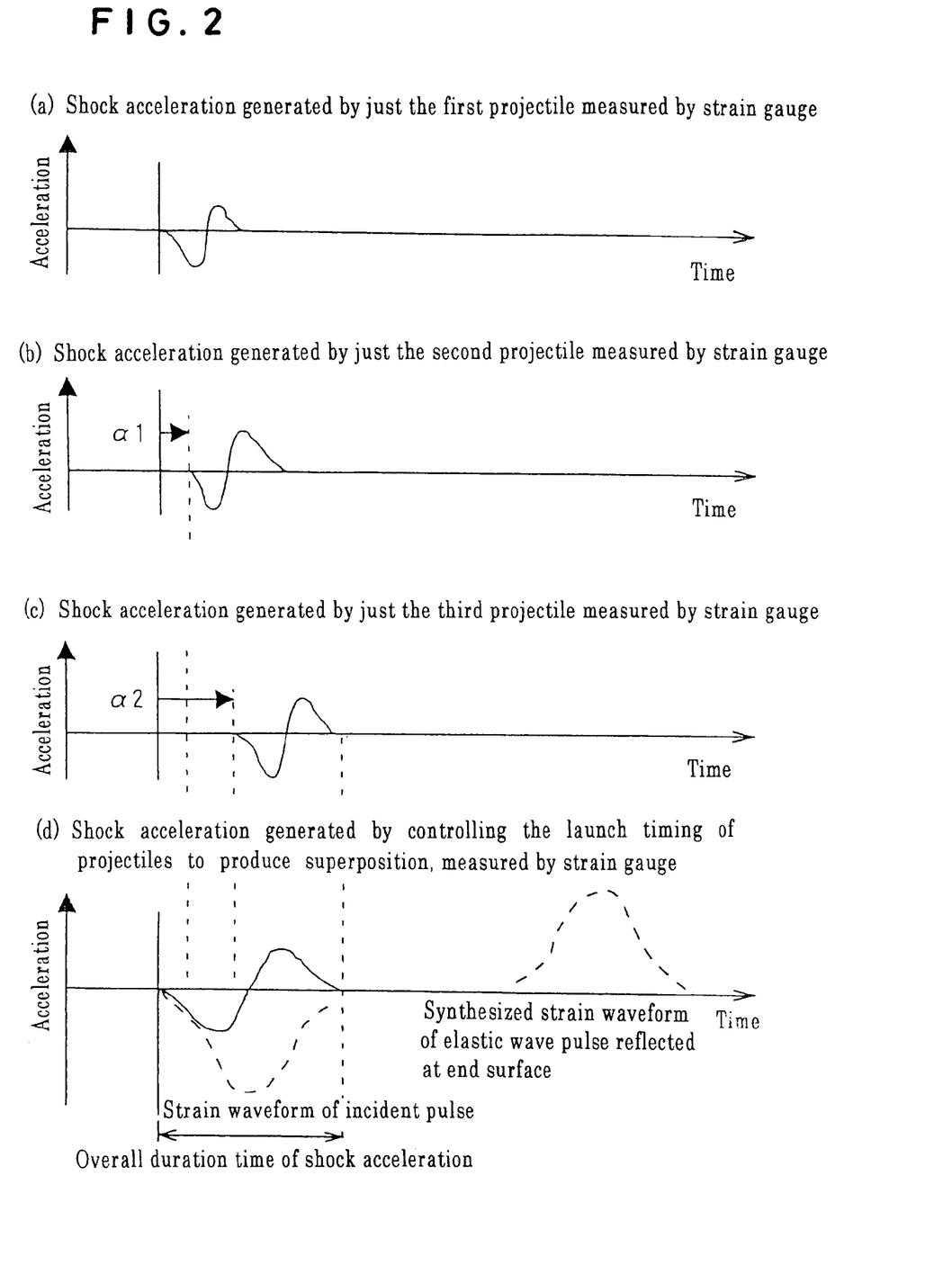
FIG. 2 is a schematic view showing examples of acceleration pulse waveforms produced by the present invention.

In this way, the elastic pulse waveforms generated in the metal rod 1 give rise to a synthesized shock acceleration waveform in the metal rod 1 shown by the solid line in FIG. 2(d), and this waveform propagates with respect to the second end surface 22 of the metal rod 1. Thus, by using a plurality of projectiles and arbitrarily setting the launch timing of each projectile, in accordance with the superposition principle, overall, it becomes possible to generate a shock acceleration waveform having a prescribed duration time.

In the illustrated example, a triple launch tube is used, the example showing three projectiles being used. However, the present invention can use from two projectiles to even greater number of n projectiles in the same way described above. It is preferable for the contact surfaces between the launch tubes 4, 5 and 6 and the projectiles 8, 10 and 12, and the peripheral surface of each projectile, to be lubrication treated or provided with a surface treatment layer that lowers the friction coefficient.

High-polymer material, plastics, wood or the like can be affixed to the tip of the projectiles to narrow the frequency band of elastic wave pulses generated in the metal rod 1 by the launch of each projectile. In this case, multilayer projectiles may be used in which the projectile body has a laminated structure of different materials, such as metal, high-polymer material, plastics, wood and so forth.

An elastic wave pulse generated at the first end surface 2 of the metal rod 1, as described above, propagates within the metal rod 1 and reaches the second end surface 22, and is reflected. Shock acceleration generated normal to the end surface in the reflection process is input to an acceleration sensor 23 that is the calibration object attached to that end surface. Also, the shock acceleration is measured precisely using a strain gauge 25 or a laser interferometer 24, or using both, if necessary, and carrying out comparisons with the measured values from the acceleration sensor 23.

In the detection of the shock acceleration that is generated, when using a strain gauge 25 affixed to a side surface of the rod, the strain gauge 25 can be implemented as a single unit, or as a plurality arrayed axially along the metal rod axis, or as a plurality in the radial direction. In the example shown in FIG. 1, there are three arrays of N gauges separated by $L_1, L_2, L_N$ from the first end surface 2.

In using a plurality of strain gauges, the output signal from each gauge is input to a personal computer 26 used as a processor and processed to obtain frequency characteristics of a gauge output at a representative location, and a predetermined correction function is used to obtain a result equivalent to the measured results of the laser interferometer 24. Moreover, although the above embodiment shows an example in which the laser interferometer 24 and the strain gauge 25 are used, the present invention can also be implemented using just either one.

In using the acceleration sensor calibration and evaluation apparatus having the above configuration to actually carry out calibration and evaluation, the theory described below can be used to carry out accurate calibration and evaluation. That is, an elastic wave pulse is generated and propagated in a metal rod by a shock imparted by impacting a projectile on the end surface of the metal rod that is adequately long compared with its diameter. At the time the elastic wave pulse reaches the end surface and is reflected, with respect to the propagation velocity (C) of the longitudinal elastic wave and the strain rate of the incident elastic wave pulse, the strain rate of the incident elastic wave pulse is [Formula 1] $\dot{\epsilon}(t)$ and the end surface of the rod moves at the following acceleration that is twice the product of the propagation velocity (C) of the longitudinal elastic wave and the above strain rate [Formula 2] $\alpha(t)=2C\dot{\epsilon}(t)$.

In the case of multiple launch tubes n (n=1 ... N), taking $\epsilon_n$ as the strain of the incident elastic wave pulse produced by the launch tubes n, the superposition principle applies to the elastic wave, so the following equation holds. Here, represents a differential relating to time.

$$a(t) = 2C \sum_{n=1}^{N} \dot{\epsilon}_n(t) \tag{1}$$

In practice, it is not possible to affix the strain gauge on the boundary between the round rod end surface and the rod side surface, so it is assumed that it is affixed at a location that is $L_n$(n=1 ... N) away from the impacted end surface of the rod. Also, $L_1$ is taken as the representative gauge location of a plurality of gauges affixed axially along the rod. In this case, at each $L_n$(n=1 ... N) location, the wave incident on the end surface on which the acceleration sensor has been attached and the reflected wave have to be separated and observed.

Since in accordance with elastic wave propagation theory, the elastic wave pulse strain in a round rod section that is far enough away from the impacted end surface will be a plane wave, it can be analytically expressed as a distance and time (at which the projectile impact is assumed to start) from the impacted end surface. Thus, as a plane wave, the internal strain ($\epsilon(z,t)$) of the rod can be expressed by the following equation.

$$\epsilon(z,t) = F(z,t) \tag{2}$$

F(z,t) is expressed as follows. (Skalak's solution in the case of the first term of a series solution)

$$F(z, t) = \varepsilon_t(t, z) - \varepsilon_t\left(t - \frac{2l_p}{C_p}, z\right) \tag{3}$$

Here,
t: time
$l_p$: length of projectile
$C_p$: propagation velocity of longitudinal elastic wave in projectile
$\epsilon_t$(t, z): primary term of Skalak's solution $$\varepsilon_t(t, z) = \frac{V_1}{\pi C}\left[\int_0^\infty \frac{\sin\left(\alpha_1\eta + \frac{\eta^3}{3}\right)}{\eta}d\eta + \int_0^\infty \frac{\sin\left(\alpha_2\eta + \frac{\eta^3}{3}\right)}{\eta}d\eta\right] \tag{4}$$

$$\alpha_1 = \frac{Z - Ct}{\left[\frac{3}{16}v^2 D_a^2 Ct\right]^{\frac{1}{3}}} \tag{5}$$

$$\alpha_2 = \frac{-Z - Ct}{\left[\frac{3}{16}v^2 D_a^2 Ct\right]^{\frac{1}{3}}} \tag{6}$$

Here,
$V_1$: collision velocity of projectile
t: elapsed time from collision
v: Poisson ratio
$D_a$: diameter of metal rod
z: horizontal coordinate of metal rod Next, the following procedure is used in order to raise the sensitivity and noise resistance when a large number of strain gauges are used. The average value at the output section of a plurality of gauges at location $L_n$(n=1 ... N) is taken to be $\epsilon_{Ln}(t)$ (t=0 is impact starting time). A wave takes time to propagate, so a signal output by strain gauges at location $L_n$(n=1 ... N) will not be in phase. So, in accordance with the following procedure, using Equation (3), the output of a gauge affixed at location $L_2 ... L_N$ can be converted to an equivalent output at the representative location.

$$\varepsilon_n^e(t) = L^{-1}\left[L[\varepsilon_{Ln}(t)] \frac{L\left[F\left(L_1, t - \frac{(L_n - L_1)}{C}\right)\right]}{L[F(L_n, t)]}\right] (n = 2 ... N) \tag{7}$$

Here, [Formula 10] $\epsilon_r(L_1,t)$ are a Laplace operator and an inverse Laplace operator. Therefore, elastic wave pulse strain $\epsilon_r(L_1,t)$ at the representative location can be expressed by the following equation.

$$\varepsilon_r(L_1, t) = \varepsilon_{LI}(L_1, t) + \sum_{n=2}^{N} \varepsilon_n^e(t) \tag{8}$$

In this way, by averaging the signals output from a plurality of strain gauges, it is possible to reduce the effect of noise and measure minute dynamic strain, that is, it is possible to measure low peak acceleration.

When elastic wave dispersion and attenuation and the like due to the propagation of an elastic wave pulse from the representative strain gauge location to the end surface where the acceleration sensor is attached are not taken into consideration, since the distance from the representative location of the plurality of strain gauges to the end surface where the acceleration sensor is attached is $L-L_1$, if $\epsilon_r(L_1,t)$ is used, acceleration $a(t)$ generated at the end surface where the acceleration sensor is attached can be expressed by the following equation.

$$a(t) = 2C\dot{\varepsilon}_r\left(L_1, t - \frac{L-L_1}{C}\right) \tag{9}$$

In cases where gauge frequency response is also ignored, it is possible to obtain the frequency characteristics of the acceleration sensor shown by the following Equation (10) by comparing the input signal to the acceleration sensor shown in the above Equation (9) with the output signal ($a_{out}(t)$) of the acceleration sensor in the frequency domain.

$$\frac{L[a_{out}(t)]}{2Cj\omega L\left[\varepsilon_r\left(L_1, t - \frac{L-L_1}{C}\right)\right]} \tag{10}$$

Also, with respect to the strain gauge output signal at the representative location obtained by Equation (9), Equation (3) is applied to obtain the strain $\epsilon_{nT}(t)$ of the elastic wave pulse incident on the end surface where the acceleration sensor is attached. For this, the following equation is used.

$$\frac{L[\varepsilon_{riT}(t)]}{L[\varepsilon_r(t)]} = \frac{L[F(L, t)]}{L[F(L_1, t)]} \tag{11}$$

The acceleration at which the end surface moves is established from the above Equation (11), so the frequency response of the acceleration sensor is obtained in accordance with the following equation.

$$\frac{L[a_{out}(t)]}{2Cj\omega L[\varepsilon_{rit}(t)]} \tag{12}$$

Also, when a laser interferometer is used, the velocity ($v_{iL}(t)$) of the motion of the end surface of the rod where the acceleration sensor is attached can be measured using the laser interferometer, enabling the frequency response of the acceleration sensor to be obtained from the following Equation (13).

$$\frac{L[a_{out}(t)]}{L\left[\frac{dv_{iL}(t)}{dt}\right]} = \frac{2j\omega L[a_{out}(t)]}{L[v_{iL}(t)]} \tag{13}$$

Also, the fact that the following equation is established between the velocity ($v_L(t)$) of rod end surface motion measured by the laser interferometer and the strain ($\epsilon_{iL}(t)$) of the elastic wave pulse incident on the end surface is utilized.

$$v_L(t)=2C\varepsilon_{iL}(t) \tag{14}$$

The acceleration sensor transfer function can be obtained by multiplying the correction function ($G_{CL}(j\omega)$) of the following Equation (15) obtained by comparing the strain ($\epsilon_{iL}(t)$) of the elastic wave pulse incident on the end surface obtained by the above Equation (14) with the strain signal at the representative location at the frequency region by the above Equation (10).

$$G_{CL}(j\omega) = \frac{L\left[\varepsilon_r\left(L_1, t - \frac{L-L_1}{C}\right)\right]}{L[\varepsilon_{iL}(t)]} \tag{15}$$

If a metal ball is attached so that it contacts the end surface of the metal rod and projectiles are launched at the ball from the round, concentric multiple launch tubes at a precisely controlled launch timing to thereby generate elastic wave pulses within the rod, the calibration and evaluation of the acceleration sensor can be carried out with greater accuracy.

INDUSTRIAL APPLICABILITY

As described in the foregoing, the present invention has a configuration in which an acceleration sensor is fixed to one end surface of a metal rod, a strain gauge is attached to a side surface of the metal rod, or a laser interferometer is disposed to irradiate the one end surface of the metal rod with a laser beam, and a plurality of projectiles are made to impact the other end surface of the metal rod at prescribed time intervals, so that in the generation of shock acceleration, it may be possible to control the frequency band of the shock acceleration. This makes it possible to increase the duration time of the elastic wave pulses more than ten-fold compared with when a projectile is launched on its own, especially to when the projectile launched on its own is fabricated of just metal, such as aluminum. This increases the usefulness of shock acceleration as a measurement standard. It also becomes possible to broaden the overlap between the acceleration sensor calibratable region using a conventional vibration table and the acceleration sensor calibratable region using shock acceleration.

Moreover, in the evaluation of an acceleration sensor, although the frequency characteristics can differ depending on the structure of the acceleration sensor, in accordance with the present invention, the input acceleration frequency band dependency of the acceleration sensor frequency characteristics can be revealed by how much of a resonant frequency excitation component included in the frequency component of the incident shock acceleration.

Also, in this invention, the effect of parasitic rolling vibration is smaller than in acceleration sensor calibration using a vibration table, so that as a result, it may become possible to calibrate an acceleration sensor more accurately than acceleration sensor calibration using a vibration table. The parasitic rolling vibration of a single-axis vibration table is itself frequency dependent. This is normally ignored, but originally was something that had to be taken into consideration, but in the present invention, this sort of problem does not arise.

Moreover, shock acceleration can be flexibly generated by compiling a database of shock acceleration waveform, strain waveform and other data obtained when each projectile is launched on its own, and shock acceleration waveform, strain waveform and other data obtained when the launch timing of a plurality of projectiles is controlled, with projectile structure, projectile shape, projectile launch conditions and the mutual launch timing of a plurality of projectiles constituting parameters.

Further, with respect to acceleration sensors used for measuring shock acceleration, because of the connection with resonant frequency, the frequency characteristics thereof are unclear, and since in accordance with the present invention, in situations where it is unclear with respect to what frequency bands can be measured, or what the upper frequency limit is, the input acceleration frequency band dependency of the frequency characteristics of the acceleration sensor can be clarified, and thus the reliability of the peak shock acceleration measurement values is increased.

Also, when a large number of strain gauges are attached, it becomes possible to measure peak values of low shock acceleration, and shock testing at frequency domains in which there are wide areas of industrial application becomes possible.

Also, the object of making the metal rod to which the acceleration sensor is affixed a round rod is an axial symmetry, so the generated acceleration has very high linearity.

The invention claimed is:

1. An acceleration sensor calibration and evaluation method comprising:
   attaching a strain gauge to a side surface of a metal rod and affixing an acceleration sensor to be calibrated and evaluated to one of end surfaces of the metal rod;
   impacting a plurality of projectiles against the other of the end surfaces of the metal rod to generate an elastic wave pulse in the metal rod;
   taking as an input signal to an acceleration sensor and a strain gauge, dynamic displacement, velocity or acceleration in a direction normal to the other end surface arising in a process of the elastic wave pulse generated at the other end surface of the metal rod reaching and being reflected by the one end surface where the acceleration sensor is affixed;
   measuring the input signal with the acceleration sensor and the strain gauge;
   processing measurement values of the strain gauge to obtain an acceleration; and
   comparing the acceleration with an output of the acceleration sensor.

2. The acceleration sensor calibration and evaluation method according to claim 1, further comprising, in addition to processing measurement values of the strain gauge, error-correcting a strain gauge output based on elastic wave theory.

3. An acceleration sensor calibration and evaluation method comprising:
   affixing an acceleration sensor to be calibrated and evaluated to one of end surfaces of a metal rod;
   locating a laser interferometer that irradiates the one end surface of the metal rod with a laser beam;
   impacting a plurality of projectiles against the other of the end surfaces of the metal rod at prescribed time intervals to generate an elastic wave pulse in the metal rod;
   taking as input signals to the laser interferometer and the acceleration sensor, dynamic displacement, velocity and acceleration in a direction normal to the other end surface arising in a process of the elastic wave pulse generated at the other end surface of the metal rod reaching and being reflected by the one end surface where the acceleration sensor is affixed;
   measuring any one of said input signals with the acceleration sensor and the laser interferometer;
   processing measurement values of the laser interferometer to obtain an acceleration; and
   comparing the acceleration with an output of the acceleration sensor.

4. An acceleration sensor calibration and evaluation method comprising:
   attaching a strain gauge to a side surface of a metal rod and affixing an acceleration sensor to be calibrated and evaluated to one of end surfaces of the metal rod;
   locating a laser interferometer that irradiates said metal rod one end surface with a laser beam;
   impacting a plurality of projectiles against the other of the end surfaces of the metal rod to generate an elastic wave pulse in the metal rod;
   taking as input signals to the strain gauge, the laser interferometer and the acceleration sensor, dynamic displacement, velocity and acceleration in a direction normal to the other end surface arising in a process of the elastic wave pulse generated at the other end surface of the metal rod reaching and being reflected by the one end surface where the acceleration sensor is affixed;
   processing measurement values of the strain gauge to obtain an acceleration;
   measuring any one of said input signals with the strain gauge, the acceleration sensor and the laser interferometer;
   processing measurement values of the strain gauge to obtain an acceleration;
   using a correction function relating to dynamic characteristics of the strain gauge based on measurement values of the laser interferometer to correct the acceleration obtained by the strain gauge processing; and
   comparing the corrected acceleration with an output of the acceleration sensor.

5. The acceleration sensor calibration and evaluation method according to claim 4, further comprising, in addition to the step of processing measurement values of the strain gauge, error-correcting an output of the strain gauge based on elastic wave theory.

6. The acceleration sensor calibration and evaluation method according to any one of claims 1 to 5, wherein calibration and evaluation of the acceleration sensor are performed by measuring any of gain-frequency characteristics, phase-frequency characteristics and peak sensitivity of the acceleration sensor in respect of any of dynamic displacement detection function, velocity detection function and acceleration detection function of the acceleration sensor.

7. The acceleration sensor calibration and evaluation method according to any one of claims 1, 2, 4, and 5, wherein the strain gauge comprises a plurality of strain gauges attached to the side surface of the metal rod in an axial direction, and further comprising converting differences in phase caused by differences in attachment position in the axial direction to a one-point measurement result, with respect to outputs of the strain gauges, based on wave propagation theory, to perform signal processing to reduce strain gauge signal noise.

8. The acceleration sensor calibration and evaluation method according to claim 6, wherein the strain gauge comprises a plurality of strain gauges attached to the side surface of the metal rod in an axial direction, and further comprising converting differences in phase caused by differences in attachment position in the axial direction to a one-point measurement result, with respect to outputs of the strain gauges, based on wave propagation theory, to perform signal processing to reduce strain gauge signal noise.

9. An acceleration sensor calibration and evaluation apparatus comprising:
   a metal rod on which is fixed at one of end surfaces thereof an acceleration sensor to be calibrated and evaluated;
   a strain gauge attached to a side surface of the metal rod;
   a projectile launch means that impacts the other of the end surfaces of the metal rod with a plurality of projectiles at prescribed time intervals to generate an elastic wave pulse in the metal rod;
   the acceleration sensor and the strain gauge being for measuring as input signals any of dynamic displacement, velocity and acceleration in a direction normal to the other end surface arising in a process of the elastic wave pulse generated by the impact of the projectiles reaching and being reflected by the one end surface where the acceleration sensor is affixed; and
   a signal recording/processing apparatus that processes measurement values of the strain gauge to obtain acceleration and compares the acceleration with an acceleration sensor output to calibrate and evaluate the acceleration sensor.

10. The acceleration sensor calibration and evaluation apparatus according to claim 9, further comprising processing means that in addition to processing measurement values of the strain gauge carries out error correction of strain gauge output based on elastic wave theory.

11. An acceleration sensor calibration and evaluation apparatus comprising:
   a metal rod on which is fixed at one of end surfaces thereof an acceleration sensor to be calibrated and evaluated;
   a laser interferometer that irradiates said metal rod one end surface with a laser beam;
   a projectile launch means that impacts the other of the end surfaces of the metal rod with a plurality of projectiles at prescribed time intervals to generate an elastic wave pulse in the metal rod;
   the acceleration sensor and the laser interferometer being for measuring as input signals any of dynamic displacement, velocity and acceleration in a direction normal to the other end surface arising in a process of the elastic wave pulse generated by the impact of the projectiles reaching and being reflected by the one end surface where the acceleration sensor is affixed; and
   a signal amplification/recording/processing apparatus that processes measurement values of the laser interferometer to obtain acceleration and compares the acceleration with acceleration sensor measurement values to calibrate and evaluate the acceleration sensor.

12. An acceleration sensor calibration and evaluation apparatus comprising:
   a metal rod on which is fixed at one of end surfaces thereof an acceleration sensor to be calibrated and evaluated;
   a strain gauge attached to a side surface of the metal rod;
   a laser interferometer that irradiates the metal rod one end surface with a laser beam;
   a projectile launch means that impacts the other of the end surfaces of the metal rod with a plurality of projectiles at prescribed time intervals to generate an elastic wave pulse in the metal rod;
   the acceleration sensor, the strain gauge and acceleration sensor being for measuring as input signals any of dynamic displacement, velocity and acceleration in a direction normal to the other end surface arising in a process of the elastic wave pulse generated by the impact of the projectiles reaching and being reflected by the one end surface where the acceleration sensor is affixed; and
   a signal amplification/recording/processing apparatus that processes strain gauge measurement values to obtain acceleration, uses a correction function relating to dynamic characteristics of the strain gauge to correct the acceleration obtained by processing a signal from the strain gauge, based on measurement values of the laser interferometer, and compares the corrected acceleration with an output of the acceleration sensor to calibrate and evaluate the acceleration sensor.

13. The acceleration sensor calibration and evaluation apparatus according to claim 9, further comprising processing means that in addition to processing measurement values of the strain gauge carries out error correction of strain gauge output based on elastic wave theory.

14. The acceleration sensor calibration and evaluation apparatus according to any one of claims 9 to 12, wherein the apparatus measures any of gain-frequency characteristics, phase-frequency characteristics and peak sensitivity of the acceleration sensor in respect of any of dynamic displacement detection function, velocity detection function and acceleration detection function of the acceleration sensor.

15. The acceleration sensor calibration and evaluation apparatus according to any one of claims 9, 10, and 12, wherein the strain gauge comprises a plurality of strain gauges attached in an axial direction on the side surface of the metal rod, and further comprising a noise reduction means that converts differences in phase caused by differences in attachment position in the axial direction to a one-point measurement result, with respect to outputs of the strain gauges, based on wave propagation theory, to perform signal processing to reduce strain gauge signal noise.

16. The acceleration sensor calibration and evaluation apparatus according to claim 15, wherein the strain gauge comprises a plurality of strain gauges attached in an axial direction on the side surface of the metal rod and a plurality of attached strain gauges disposed in a circumferential direction.

17. The acceleration sensor calibration and evaluation apparatus according to claim 16, further comprising signal processing means that converts differences in phase caused by differences in attachment position in the axial direction to a one-point measurement result, with respect to outputs of the plurality of strain gauges, based on wave propagation theory, to perform signal processing to reduce strain gauge signal noise.

18. The acceleration sensor calibration and evaluation apparatus according to any one of claims 9, 11, and 12, wherein the projectile launch means has a plurality of round, concentric projectiles located on inner and outer portions of a launch tube.

19. The acceleration sensor calibration and evaluation apparatus according to claim 18, wherein the launch tube is a round, concentric multiple launch tube and has a plurality of round, concentric projectiles in a space between a center launch tube inner portion and each launch tube.

20. The acceleration sensor calibration and evaluation apparatus according to claim 18, wherein the projectile launch means includes a launch controller that launches a plurality of projectiles independently at prescribed time intervals.

21. The acceleration sensor calibration and evaluation apparatus according to claim 18, wherein the launch tube has a surface treated to reduce friction with the projectiles.

22. The acceleration sensor calibration and evaluation apparatus according to any one of claims 9, 11, and 12, wherein the metal rod is a round rod.

23. The acceleration sensor calibration and evaluation apparatus according to any one of claims 9, 11, and 12, wherein the projectiles have tips provided with members of a different material from that of a projectile body, or wherein the projectile body is given a laminated structure comprised of different materials to adjust a frequency band of the elastic wave pulse generated in the metal rod by impact of the projectiles.

24. The acceleration sensor calibration and evaluation apparatus according to any one of claims 9, 11, and 12, wherein in accordance with Skalak's analytic solution in elastic wave theory, when obtaining a transient strain signal forming strain gauge input from the strain of an elastic wave pulse signal incident on the other end surface, at least a primary term of a series expanded Skalak's analytic solution is used, or, to further improve precision, up to a high-order term of a Skalak's analytic solution is used.

25. The acceleration sensor calibration and evaluation apparatus according to any one of claims 9, 11, and 12, wherein the other end surface of the metal rod has a contact metal ball and the projectiles are impacted against the metal ball.

\* \* \* \* \*